INVENTORS
JAMES H. MORAN &
JAY TITTMAN

United States Patent Office 3,521,064
Patented July 21, 1970

3,521,064
ANALYSIS OF GAMMA RAY ENERGY SPECTRUM FOR CONSTITUENT IDENTIFICATION
James H. Moran and Jay Tititman, Danbury, Conn., assignors to Schlumberger Technology Corporation, Houston, Tex., a corporation of Texas
Filed Feb. 17, 1967, Ser. No. 616,971
Int. Cl. G01t 1/16
U.S. Cl. 250—83.3
12 Claims

ABSTRACT OF THE DISCLOSURE

In the particular embodiment of the invention described herein, the neutron capture gamma ray spectrum of an unknown earth formation material is analyzed by matching it with a composite spectrum made up of weighted spectra of known constituent materials. To accomplish this, a multichannel pulse height analyzer separates the spectrum of the unknown material into selected energy bands and supplies information representing the gamma ray intensity in each band to a computer which determines the proportions of known constituents providing the best composite spectrum match with the unknown material spectrum.

---

Figure 1:
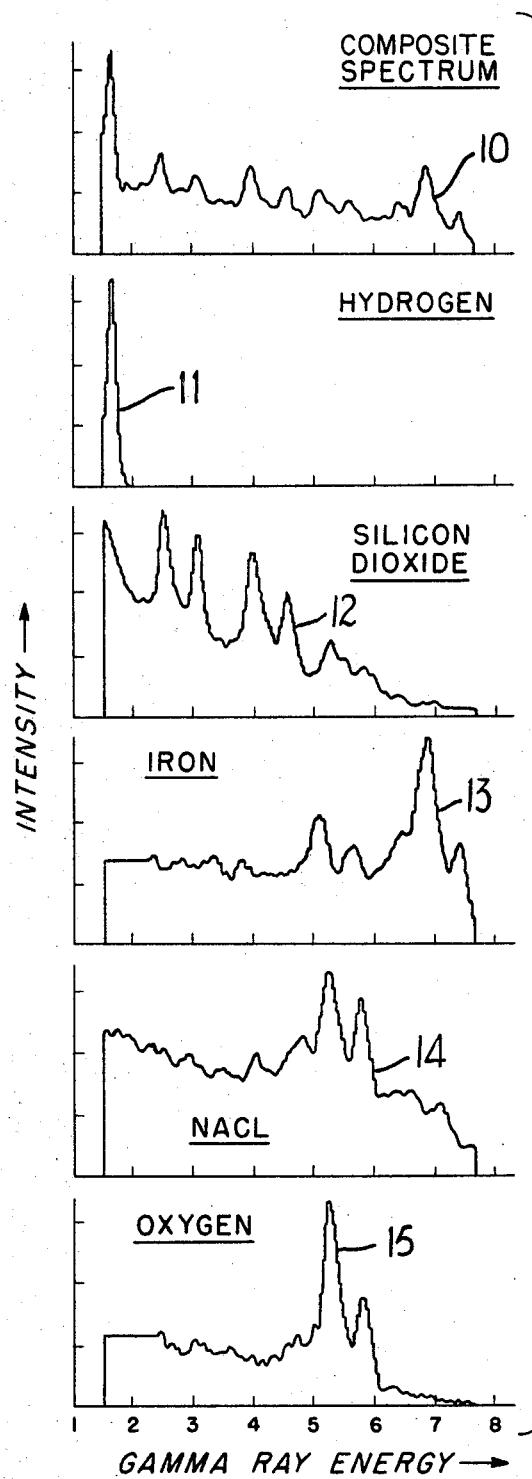

This invention relates to nuclear well logging systems for determining the nature of formations through which a well bore passes and, more particularly, to a new and improved system for identifying the constituents of a formation by analysis of gamma ray energy spectra.

In one form of nuclear well logging, the formation adjacent to a well bore is irradiated with neutrons, and gamma rays resulting from the capture of neutrons by certain elements in the formation are detected by a gamma ray detector within the well bore. Inasmuch as the energies of the neutron capture gamma rays emitted by each element are characteristic of that particular element, it has been proposed previously to determine the nature of the formation adjacent to the well bore by analysis of the gamma ray energies detected following irradiation of the formation with neutrons. Heretofore, however, the total detected gamma ray energy spactrum has merely been inspected visually for the occurrence of certain peaks or certain energy levels, or bands have been selected for automatic comparison of the total detected gamma ray intensity with that at other energy levels and described, for example, in the patents to Dewan et al., No. 3,108,188 and Johnson No. 3,139,528.

While such methods often provide indications of the presence or absence of certain elements or combination of elements they are unable to reveal complete information about the composition of the formation or to produce an analysis of all of the constituent elements contributing to the gamma ray energy spectrum. Furthermore, other proposals for analysis of gamma ray energy spectra involving successive subtraction of characteristic spectra, starting with the highest gamma ray energies, are subject to substantial cumulative errors. Analysis of gamma ray scintillation spectra has heretofore been considered impractical for well formation quantitative constituent analysis because it was believed that interference from the well casing and cement, and spectral degradation of the formation emission spectrum by multiple Compton scattering would make it impossible to obtain useful information.

Accordingly, it is an object of the present invention to provide a new and improved system for analyzing gamma ray spectra to determine the composition of a well formation, which effectively overcomes the disadvantages of the prior art.

Another object of the invention is to provide a new and improved apparatus for analyzing gamma ray spectra to determine formation composition accurately and completely.

These and other objects of the invention are attained by determining the gamma ray energy spectrum of an unknown well formation material assumed to have a selected maximum number of known constituents and matching the detected gamma ray energy spectrum with a composite spectrum made up of a weighted spectra of a maximum number of possible constituents of the formation. Illustratively, the gamma ray spectra are those resulting from neutron capture and the matching is preferably accomplished by comparing the detected spectrum and the composite spectrum at a selected number of different energies, the selected number being no less than the maximum number of possible constituents.

More particularly, the composite spectrum is made up of the possible formation constituents which have substantially constant composition, such as sand, limestone, or the like, and the spectra for those constituents are measured separately. For constituents of variable mineral composition, such as clay, the spectra of the variable clay mineral components thereof, such as illite, montmorillonite, kaolinite may be measured and used in the analysis. In addition, the gamma ray spectra of possible fluid constituents of porous formations, such as oil or salt water, are measured, the salt spectrum preferably being separated from the water spectrum because the salinity may be variable. By comparing the magnitudes of the detected gamma ray energy spectrum at a large number of separate points or energy levels with the magnitude of the composite spectrum consisting of weighted proportions of all of the individual spectra for constituents which may be included in the formation, to obtain the best possible match, preferably by the least squares method, an accurate analysis of the formation composition can be obtained.

Apparatus for carrying out the invention preferably includes an enregy magnitude detecting arrangement for producing pulses having a magnitude corresponding to the energy of the gamma rays detected and a device for segregating the pulses from the detector according to the energy of the corresponding gamma rays, along with a computer for determining the weights, or relative proportions, of the constituents from the pulse intensity distribution. Preferably, the weight factors are continuously recorded on a moving record medium as the detecting instrument bearing the neutron source and gamma ray detector is moved through the well bore. If desired, the computer may also determine certain ratios of the detected values representing, for example, the salinity or porosity of the formation, for simultaneous recording. In certain instances, it may be desirable to provide a complete record of the detected gamma ray spectra for later analysis and, in that case, a pulse storage arrangement may be provided to accumulate the pulses according to gamma ray energy values and record the totals at a large number of points in the energy spectrum after a selected time interval. In such cases, the downhole instrument may be held stationary during the measurement.

Figure 2:
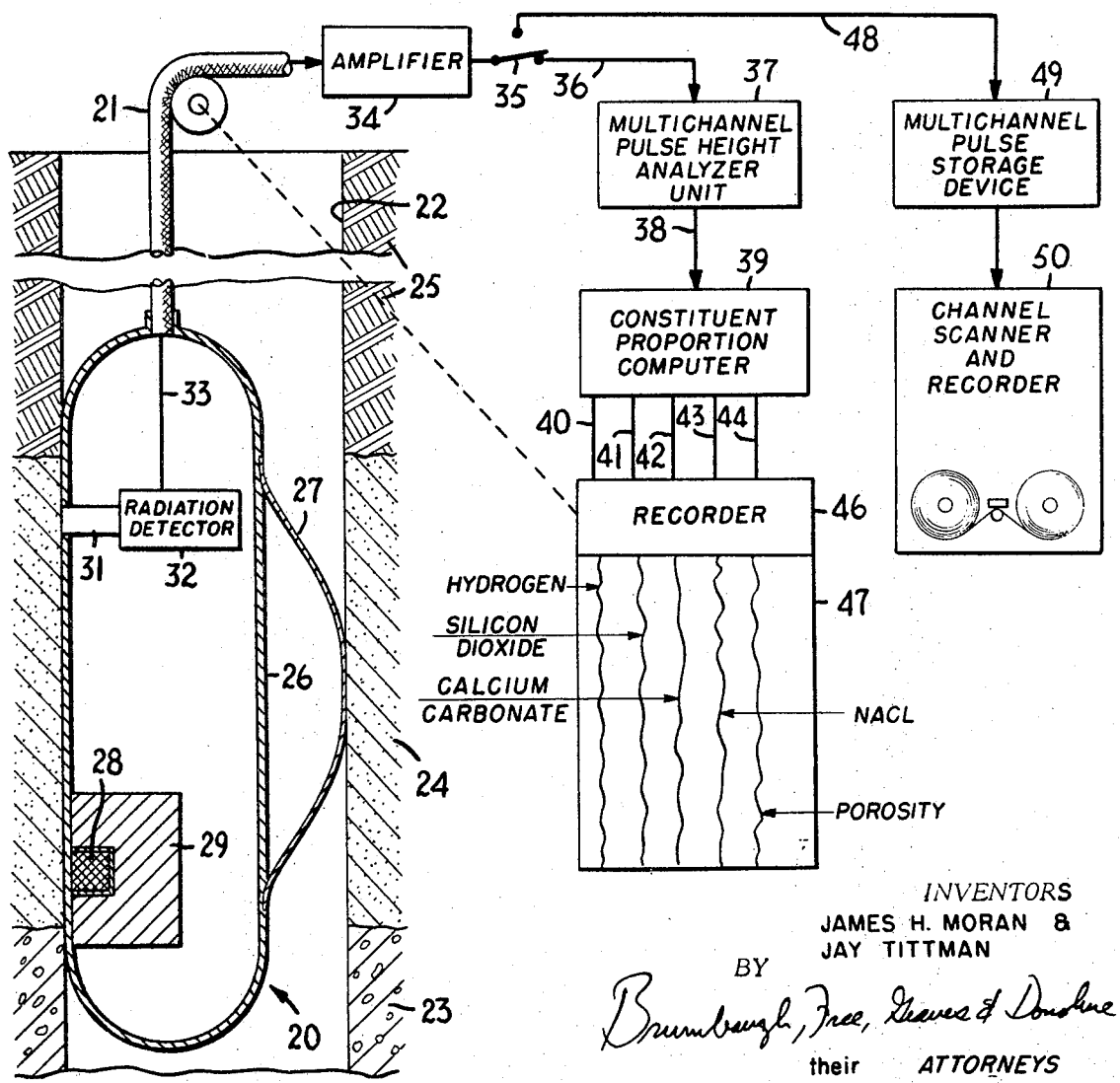

Further objects and advantages of the present invention will be apparent from a reading of the following description in conjunction with the accompanying drawings in which:

FIG. 1 is a graphical representation illustrating a typical composite gamma ray spectrum showing the distribution of gamma ray intensities with respect to energy along with gamma ray spectra for constituents of the composite spectrum; and FIG. 2 is a schematic block diagram illustrating a representative analyzing system according to the invention for use in well logging operations.

In the graphical representation shown in FIG. 1, a composite gamma ray spectrum 10 is illustrated which is made up of a number of constituent spectra, the identity and spectral distribution of which are known. The relative proportions of the constituent spectra, however, including knowledge of their presence or complete absence in any given case, is not known and must be determined in order to provide the necessary information as to the composition of the material being analyzed. For example, in well logging operations it is known that the well bore may have been drilled through sand or limestone, to select only two possible formation materials, and if the formation is porous it may contain salt water or oil. From a knowledge of the individual spectra for silicon dioxide, which is present in sand, or calcium carbonate, which is found in limestone, therefore, the measured gamma ray spectrum for the unknown formation material adjacent to the well bore may be analyzed to determine the presence and proportion of those constituents.

Accordingly, FIG. 1 also illustrates representative neutron capture gamma ray spectra for possible constituents of the particular formation being analyzed, the line 11 representing the hydrogen spectrum, the line 12 being the silicon dioxide spectrum, and the line 13 corresponding to the iron spectrum, which, in combination with the spectra for certain other elements (not shown) and that for silicon dioxide, can be used to indicate the response from limestone or sand formations. Since the salinity of salt water may vary, the sodium chloride spectrum is measured separately and is represented in FIG. 1 by the curve 14.

All of the constituent spectra 11, 12, 13 and 14 in FIG. 1 are illustrative only and have been normalized to corresponding maximum amplitudes. Consequently, it will be understood that their magnitudes in FIG. 1 do not add up to the magnitude of the composite spectrum 10 at every energy value, as will be the case in practice. Moreover, as previously indicated, there are other constituent spectra, such as dolomite, anhydrite, limestone and the like, not illustrated in FIG. 1, which must be included in an analysis of the detected spectrum of an unknown formation material if those constituents are believed to be present. Furthermore, it will also be understood that the constituent spectra 11, 12, 13, and 14 are measured in the same manner as will be carried out in the well bore, so that they include any effects resulting from instrumentation, such as the usual "smearing" toward the lower energy values.

To determine the composition of a formation according to the invention, the magnitude of the detected neutron capture gamma ray spectrum is compared at a large number of energy points or levels with a composite spectrum made up of all of the constituent spectra, normalized relative to one another by weight, or amplitude, coefficients representing the relative proportions of the corresponding constituents. Different criteria can be chosen to establish when a "best fit" between the composite spectrum and the formation spectrum has been achieved. The mathematical statement of the criterion used permits the determination of the weights to be applied to the constituent spectra. One such criterion, the "least-squares fit," will be elaborated as an illustration of the invention herein disclosed. Let $g(E)$ be the function describing the detected spectrum amplitude with respect to energy (detector counts per unit interval of energy per unit time) and $f(E)$ be the sum of all the normalized individual constituent spectra $f_i(E)$, each multiplied by a corresponding weighting factor $w_i$ indicating the proportion of that constituent in the formation. Then the least squares criterion requires that $$\int [f(E)-g(E)]^2 dE = \int \left[\sum_{i=1}^{n} w_i f_i(E) - g(E)\right]^2 dE \quad (1)$$

where $n$ constituents are used, shall be a minimum. The manner in which this condition permits the determination of the $w_i$ is now examined.

The partial derivative of the right-hand term of Equation 1 is taken separately with respect to each weighting factor $w_k$ and set equal to zero, producing a set of $n$ simultaneous equations $$\int \left[\sum_{i=1}^{n} w_i f_i(E) - g(E)\right] f_k(E) dE = 0;\ k=1,2,\ldots,n \quad (2)$$

These can also be written $$\sum_{i=1}^{n} w_i F_{ik} - G_k = 0;\ k=1,2,\ldots,n \quad (3)$$

where $$F_{ik} = \int f_i(E) f_k(E) dE = F_{ki} \quad (4a)$$

$$G_k = \int g(E) f_k(E) dE \quad (4b)$$

Since $g(E)$ is the formation spectrum and $f_i(E)$ and $f_k(E)$ are known constituent spectra, it will be readily apparent that the Equations 3 are a set of $n$ linear equations in $n$ unknowns ($w_i$) and can therefore be solved uniquely for all the weights representing the contributions of the $n$ constituents assumed to be present in the formation.

Consider a simple example where $n=3$ (i.e., a maximum of 3 constituents is present in the formation). The number of energy points or bands selected for approximating the integrals in Equations 4a and 4b can be as large as we please so long as it is $\geq 3$. Then Equations 3 become $$G_1 = F_{11}w_1 + F_{12}w_2 + F_{13}w_3 \quad (5a)$$
$$G_2 = F_{21}w_1 + F_{22}w_2 + F_{23}w_3 \quad (5b)$$
$$G_3 = F_{31}w_1 + F_{32}w_2 + F_{33}w_3 \quad (5c)$$

and the weighting factor $w_1$ can be expressed as $$w_1 = \frac{\begin{vmatrix} G_1 & F_{12} & F_{13} \\ G_2 & F_{22} & F_{23} \\ G_3 & F_{23} & F_{33} \end{vmatrix}}{\begin{vmatrix} F_{11} & F_{12} & F_{13} \\ F_{21} & F_{22} & F_{23} \\ F_{31} & F_{32} & F_{33} \end{vmatrix}} \quad (6)$$

the well-known ratio of the determinants indicated. $w_2$ and $w_3$ are expressed in a similar form. When the determinants are expanded, the equations for the $w$'s take the form $$w_1 = \alpha_{11}G_1 + \alpha_{12}G_2 + \alpha_{13}G_3 \quad (7a)$$
$$w_2 = \alpha_{21}G_1 + \alpha_{22}G_2 + \alpha_{23}G_3 \quad (7b)$$
$$w_3 = \alpha_{31}G_1 + \alpha_{32}G_2 + \alpha_{33}G_3 \quad (7c)$$

where the coefficients $\alpha$ constitute the inverse of the F matrix and are thus directly computable from the numbers $F_{ik}$ which, as pointed out above, are determined from integrals of products (Equation 4a) among pairs of constituent spectra. Also, as pointed out above, the numbers $G_k$ are computed by taking integrals of products (Equation 4b) of the measured formation spectrum $g(E)$ with the constituent spectra $f_i(E)$. Accordingly, by separately preparing the $\alpha$'s of Equations 7a, 7b and 7c one can then determine the unknown weights or proportions of various constituents in terms of known relationships between the spectra of the constituents and information obtainable from the detected spectrum of an unknown sample. Thus, the composition of the unknown sample can be determined. Moreover, if desired, certain information relating to the structure of the formation, such as porosity or salinity, can be obtained by taking the ratios of selected constituent proportion values in the usual manner.

By using constituent spectra obtained from actual measurements made on pure constituent materials with the same type of detector as will be used in the downhole logging operation rather than theoretical spectra computed from the known composition of the constituents, any features in the spectrum resulting from the method of measuring, such as the smearing effect previously mentioned, are automatically taken into account.

Furthermore, steps may be taken to eliminate from the analysis certain gamma ray indications which may appear in the detected spectrum but do not correspond to any constituent of the formation material. For example, in instances where gamma rays from iron in a casing disposed in the well bore or from the cement surrounding the casing may interfere with the determination of formation material, certain of the constituent spectra, such as those of silica sand and limestone, may incorporate the iron and cement indications by being made with a casing cemented into the laboratory sample of sand or limestone. As a result, any iron or cement indications in the detected spectrum will automatically be compensated. If desired, of course, the casing and cement spectra may be measured separately and included in the analysis as separate "constituents." The secondary gamma rays resulting from oxygen activation may also be eliminated from consideration in this manner. Another way of reducing the effect of materials in and around the well bore, when thermal neutron capture gamma rays are detected, is to use a pulse neutron source and delay the operation of the detector until the capture gamma rays generated from the immediate region of the source have died down to a low level.

One form of apparatus for carrying out a well logging operation utilizing the invention is illustrated in FIG. 2 wherein a downhole instrument 20, suspended on a cable 21, is drawn through a well bore 22 passing through various earth formations 23, 24 and 25 which are to be analyzed. Preferably, the instrument 20, which includes a pressure-tight housing 26, is urged against one wall of the bore during the logging operation by a bow spring 27 and, although not illustrated in the drawing, the operation may be carried out with a steel casing cemented in the well bore. Alternatively, the instrument 20 may be held in a centered position within the bore 22 by a conventional centralizing arrangement.

If the instrument is urged against one wall of the well bore in the manner illustrated in FIG. 2, a source of neutrons 28 is positioned at the side of housing 26 which is in contact with the wall so as to irradiate the adjacent formations with neutrons, the source 28 being contained within an appropriate shielding material 29. Otherwise, the source may be mounted centrally. The source 28 may comprise, for example, any conventional neutron source having low gamma ray emission, such as a polonium-beryllium or actinium-beryllium source of several curies strength, or it may be a pulse neutron source of the type described in the Goodman Pat. No. 2,991,364. By timing the operation of the detecting apparatus described hereinafter with respect to the neutron pulse to render it sensitive only after most of the neutrons in a pulse have slowed down to thermal energy, a large part of the background irradiation produced by fast neutron capture, inelastic collision, or incidence of a fast neutron on the detector can be eliminated with a pulse source of this type.

At a position longitudinally spaced from the neutron source 28, the sensitive element 31 of a radiation detector 32 is positioned in the housing 26 adjacent to the wall of the well bore 22 to receive gamma rays from the irradiated formation. The detector 32 may be of any well-known type responsive to gamma rays and adapted to produce a pulse signal in response to each gamma ray detected having an amplitude representative of the energy of the gamma ray. For example, it may comprise a conventional scintillation spectrometer utilizing a sodium iodide crystal as the sensitive element 31, along with a photomultiplier tube positioned to detect each flash of light in the crystal resulting from incidence of a gamma ray to generate a pulse corresponding thereto. Alternatively, a conventional multicrystal spectrometer may be used in the downhole instrument 20. In addition, to prevent actuation of the detector 32 by incidence of slow neutrons on the crystal, the sensitive element 31 may be encased in a boron carbide sheath to block slow neutrons while permitting gamma rays to pass. If desired, the detector 32 may also include suitable equipment for amplifying each pulse but it will be appreciated that amplification at this stage must be accomplished with high amplitude fidelity. Also, in order to reduce the counting rate capacity required of subsequent equipment, the detector may be biased in the usual manner to respond only to pulses corresponding to gamma rays having an energy greater than a predetermined value, for example, 1 mev. If desired, the pulses may be converted into code signals representing the amplitude of each pulse. In this case, amplitude fidelity need not be maintained when sending information up the cable to the surface.

Output pulses from the detector 32 are transmitted over a conductor 33 in the cable 21 to the surface of the earth where they may be amplified by an amplifier 34, if desired, before being applied through a switch 35 and a cable 36 to a multi-channel pulse height analyzer unit 37. If the amplitude of each pulse corresponds to the energy of a detected gamma ray, i.e., if no code conversion has been provided by the downhole detector, the amplifier 34 must, of course, be capable of high fidelity amplification.

The pulse height analyzer unit 37 is arranged in the usual manner to select pulses according to their amplitude and apply them to corresponding channels in an output cable 38. If a code system has been used, of course, the pulses will be selected according to some characteristic of the code representing the original amplitude of the pulses generated in the detector. The channels in the cable 38 correspond, therefore, to succesesive segments in the gamma ray energy range of interest and the number of channels into which the energy range is divided will depend upon the accuracy of analysis which is required and upon the capabilities of the equipment to be used. For a very precise analysis, the energy range from 1 to 8 mev. might, for example, be divided into 256 channels for analysis while, in many cases, a smaller number of channels such as 48 may be sufficient. In any event, the total number of channels should be greater than the number of constituent spectra to be included in the analysis. It will be understood, moreover, that the various channels need not be of the same width since the amplitude of the spectra may be considerably more variable with energy changes at certain energy levels than at others, thereby increasing the necessity for fine energy distinctions at those levels and decreasing it at the other levels.

Signals corresponding to gamma ray count amplitudes at a selected number of energy levels in the detected gamma ray spectrum are supplied through the cable 38 to a constituent proportion computer 39 where the count signals for the various channels are multiplied by preset values of $f_k(E_l)$ such that an approximation to $G_k$ in Equation 4b is derived in the form $$G_k = \int g(E) f_k(E) dE \approx \sum_{l=1}^{m} g'(E_l) f_k'(E_l) \quad (8)$$

where the spectra $g(E)$ and $f_k(E)$ are divided into $m$ discrete channels. These $G_k$ are then combined with the $\alpha_{ik}$, which are preset into the computer since they are determined beforehand, in the manner of Equations 7a, 7b, 7c. Since the number of equations equals the number of constituents, the computer automatically develops all the $w_1$. In addition, the computer may be arranged to take the ratios of selected constituent proportions to determine certain properties of the formation material, such as porosity, salinity or water saturation, and, in the illustrated example, the computer is arranged to provide signals representing the proportions of silica, limestone, salt, and hydrogen in the formation and also indicating the porosity of the formation on five output conductors 40–44, respectively. A five-position recorder 46, which may be of the usual photographic type, driven in synchronism with the cable 21, provides a continuous record 47, upon which the values represented by the signals on the lines 40–44 are recorded continuously as the instrument 20 moves through the well bore.

It will be readily apparent that the pulse data transmitted to the amplifier 34 may contain considerably more information about the formation material being analyzed than is indicated in the record 47, particularly where only a relatively small number of constituent proportions are determined. For example, while the record 47 may give sufficiently accurate instantaneous indications of formation composition to determine whether a formation is or is not of interest, a more detailed analysis may be required to ascertain what specific action should be taken with respect to a particular formation of interest. Accordingly, the amplifier 34 may be connected through the switch 35 to another line 48 leading to a multi-channel pulse storage device 49 which may have several times as many channels as the pulse height analyzer unit 37, so as to provide a substantially complete reproduction of the detected gamma ray spectrum. Because of the reduced channel width, the pulses in each channel will arrive at a slower rate for the same neutron source intensity and, consequently, the device 49 preferably accumulates the signals in all of the channels for a selected period of time, after which the totals in all of the channels are read out and recorded by a recorder 50 which may be a magnetic tape recorder, for example. The information thus preserved may be returned from the field to a laboratory for a detailed analysis more time-consuming than would be permissible in the field and carried out by equipment too bulky to transport to the well site.

Also, in order to obtain the most accurate results, the downhole instrument 20 is preferably held in fixed position in the well bore while the detailed record is made by the storage device 49 and the recorder 50. If desired, moreover, a more accurate type of radiation detector, such as a dual crystal spectrometer, which, although providing a much lower pulse rate, eliminates most of the smearing effect in the detected gamma ray spectra, may be included in the instrument 20 for stationary measurements of this type.

In operation, the maximum likely constituents of the earth formations 23, 24 and 25 to be analyzed are selected and the values of the coefficient $\alpha$ in equations similar to Equations 7a, 7b and 7c are determined and set into the constituent proportion computer 39. As the instrument 20 is moved through the well bore, neutrons from the source 28 irradiate the formations producing a spectrum of capture gamma rays which is detected by the detector 32. The detector generates pulses having amplitude corresponding to the energy of detected gamma rays and transmits them to the amplifier 34. With the switch 35 set in the position shown in FIG. 2, the pulses are applied to the pulse height analyzer unit 37 which sorts them into predetermined channels according to their amplitude and supplies signals representing the rate of receipt of the pulses in the various channels over the cable 38 to the computer 39. The recorder 46, driven in conjunction with the cable motion, continuously records the proportion values derived by the computer, thereby indicating the compositions of the formations 23, 24 and 25 according to the depth of the instrument in the well bore.

For a detailed analysis at any point, the instrument 20 is stopped and the switch 35 is moved to connect the amplifier 34 to the pulse storage device 49. In this condition, the recorder 50 scans the channels in the device 49 after selected time intervals and makes a permanent record of the complete gamma ray energy distribution spectrum.

Although the invention has been described herein with reference to a specific embodiment, many modifications and variations therein will readily occur to those skilled in the art. For example, the gamma ray energy spectrum analysis of the present invention may be carried out by comparison of gamma ray spectra obtained in other ways than by thermal neutron capture, such as those produced by inelastic scattering of fast neutrons, or by other ways than by neutron irradiation such as natural gamma ray spectra. Accordingly, all such variations and modifications are included within the intended scope of the invention as defined by the following claims.

We claim:

1. A method for determining the composition of an unknown formation material through which a well bore passes, which material consists primarily of no more than a group of postulated constituents comprising detecting the energy spectrum of gamma rays produced by constituents of the unknown material, and comparing the detected gamma ray energy spectrum of the unknown material with a composite spectrum made up of weighted spectra of the postulated constituents at a selected number of energy levels which is at least as great as the number of postulated constituents.

2. A method according to claim 1 including the step of detecting the gamma ray energy spectra of the postulated constituents prior to detection of the gamma ray energy spectrum of the unknown formation material and in the same manner as detection of the unknown material spectrum is to be carried out.

3. A method according to claim 2 including the step of detecting the gamma ray spectrum of materials present in the well bore which are not formation constituents simultaneously with the detection of the gamma ray spectrum of at least one of the known formation constituents.

4. A method according to claim 1 wherein the step of comparing the detected gamma ray energy spectrum of the unknown material is accomplished by determining the rates at which gamma rays are received at the selected energy levels, computing values related to the proportions of the constituents from the rates information, and continuously recording the values related to the constituent proportions as a detecting element is moved through the well bore.

5. A method according to claim 1 wherein the step of comparing the detected gamma ray energy spectrum of the unknown material is accomplished by recording values representing the numbers of gamma rays received at the selected energy levels, and then computing from the recorded values the proportions of the constituents.

6. A method according to claim 2 including the steps of irradiating the formation material with neutrons so as to produce neutron capture gamma rays and irradiating samples of the postulated constituents individually with neutrons in the same manner so as to produce neutron capture gamma rays.

7. Apparatus for determining the composition of an unknown formation material through which a well bore passes, which material consists primarily of no more than a postulated group of known constituents, comprising a downhole instrument adapted to be passed through a well bore, gamma ray detector means within the instrument for detecting gamma rays from constituents in the unknown material and producing electrical pulses having amplitudes related to the energy of the gamma rays detected, pulse amplitude responsive means for receiving pulses from the detector means and segregating them into a plurality of channels according to the energies of the corresponding gamma rays, and computer means responsive to signals representing the accumulation of pulses in the plurality of channels for determining from the gamma ray spectra of the known constituents the proportions of the constituents producing a composite spectrum which most nearly matches the deteched gamma ray spectrum.

8. Apparatus according to claim 7 including recorder means for continuously recording the proportions of the constituents as determined by the computer means as the downhole instrument is moved through the well bore.

9. Apparatus according to claim 7 including means for recording the accumulation of pulse signals in the plurality of channels over a selected period of time prior to computation of the constituent proportions.

10. Apparatus according to laim 7 including neutron source means within the instrument for irradiating formations adjacent to the well bore with neutrons.

11. A gamma radiation well-logging system for constituent analysis comprising a well-logging sonde, one detector within said sonde for activation in response to the gamma radiation energies of the constituents, means for converting said detector responses into a plurality of discrete signals each individual to a range of the gamma radiation energies, and a computer having stored therein the relative abundance of the gamma energies of the constituents in each of said energy ranges for comparison with said discrete signals to calculate the proportions of the constituents activating said well-logging detector.

12. Apparatus for determining the composition of an unknown formation material having a well bore therein, which material consists primarily of no more than a predetermined number of known gamma ray emitting constituents, comprising a downhole instrument, one detector within said downhole instrument responsive to the energies of the gamma rays emitted by the unknown formation, circuit means for converting said detector responses into electrical signals in a plurality of channels according to the energies of the corresponding gamma rays, and computer means responsive to the accumulation of said signals in said plurality of channels to calculate from the gamma ray spectra of the known constituents the proportion of the constituents producing a composite spectrum which most nearly matches the gamma ray spectrum emitted by the unknow formation to satisfy the formula $$\int \left[ \sum_{i=1}^{n} w_i f_i(E) - g(E) \right] f_k(E) dE = 0; \ k=1, 2, \ldots, n \quad (2)$$

wherein $g(E)$ is the spectrum of the unknown formation, $f_i(E)$ and $f_k(E)$ are constituent spectra, $n$ is the number of constituents and $w_i$ is the proportion of the $i$th constituent in the formation.

References Cited

UNITED STATES PATENTS 3,061,725  10/1962  Green _____ 250—83.6
3,277,440  10/1966  Gouilloud et al. _____ 250—83.3

RALPH G. NILSON, Primary Examiner

D. L. WILLIS, Assistant Examiner

U.S. Cl. X.R.

250—83.6